Feb. 19, 1957    C. E. GREENE ET AL    2,781,684
DUAL AUTOMATIC CYCLE MACHINE
Filed March 8, 1950    5 Sheets-Sheet 1

INVENTORS
CLAUDE E. GREENE
WALTER V. STURM
BY
Woodling and Krost
attys.

Feb. 19, 1957 C. E. GREENE ET AL 2,781,684
DUAL AUTOMATIC CYCLE MACHINE
Filed March 8, 1950 5 Sheets-Sheet 2
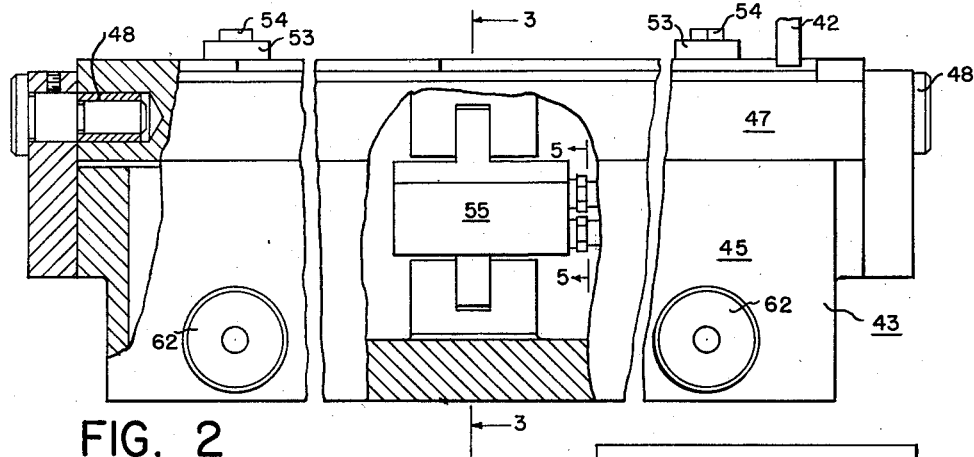
FIG. 2
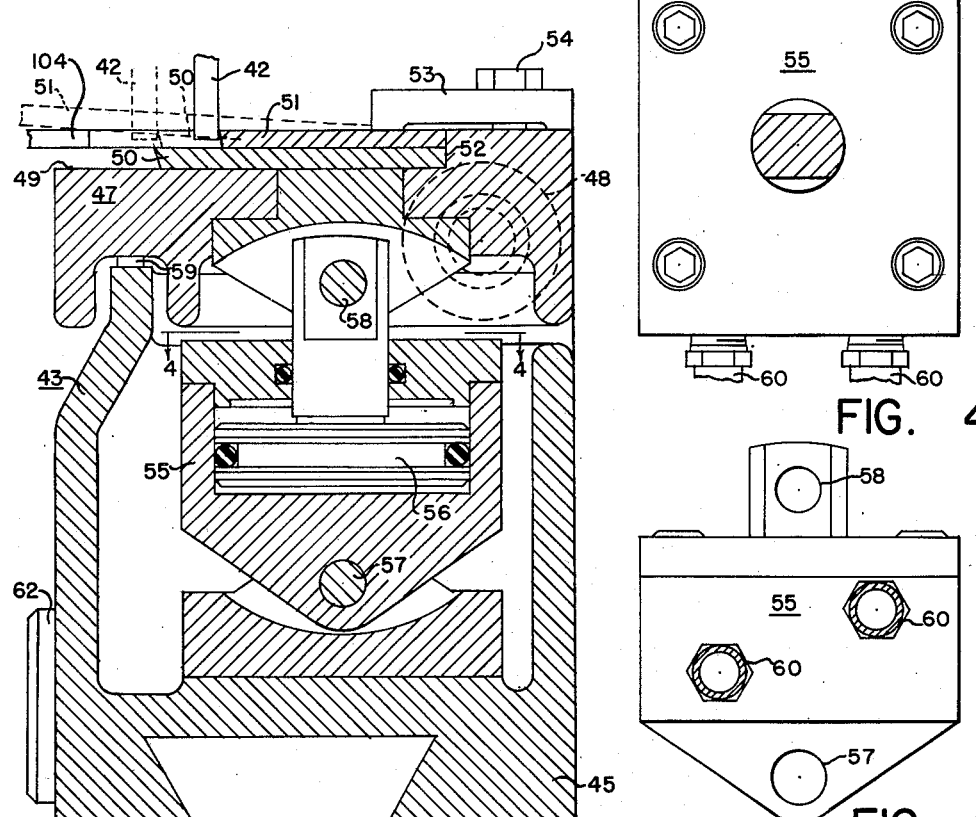
FIG. 3
FIG. 4
FIG. 5
INVENTORS
CLAUDE E. GREENE
WALTER V. STURM
BY
Woodling and Krost
attys.

INVENTORS
CLAUDE E. GREENE
WALTER V. STURM
BY
Woodling and Krost
Attys

Feb. 19, 1957     C. E. GREENE ET AL     2,781,684
DUAL AUTOMATIC CYCLE MACHINE

Filed March 8, 1950     5 Sheets-Sheet 5

INVENTORS
CLAUDE E. GREENE
WALTER V. STURM
BY
Woodling and Kroat
attys.

United States Patent Office 2,781,684
Patented Feb. 19, 1957

2,781,684

DUAL AUTOMATIC CYCLE MACHINE

Claude E. Greene and Walter V. Sturm, Sidney, Ohio, assignors to The Monarch Machine Tool Company, a corporation of Ohio Application March 8, 1950, Serial No. 148,432

4 Claims. (Cl. 82—14)

The invention relates in general to control system and more particularly to automatic control systems for automatic cycling of a machine tool.

An object of the invention is to provide automatic cycling mechanisms for a machine tool wherein the machine tool will perform a plurality of similar cycles automatically.

Another object of the invention is to provide automatic cycling mechanisms for machine tools wherein a machine tool so provided will perform two cycles and then shut itself off.

Another object of the invention is to provide a control system for a movable element of a machine tool wherein two cycles are provided thereto, each controlled by a different pattern, and wherein selected portions of each cycle may be identical.

Another object of the invention is to provide a control system for a machine tool, such as a lathe, wherein a slide thereof has a compound movement and will actuate limit switches during a first cycle of operation and will actuate some of the same limit switches during a second cycle of operation automatically begun upon completion of the first cycle, and wherein the actuation of such limit switches does not always set up the same conditions within the control system.

A further object of the invention is a control system for two superposed slides of a machine tool wherein the lower slide is driven by a motor controlled only by limit switches and wherein the upper slide moves at an acute angle to the movement of the lower slide and is controlled by a pattern and tracer assembly, and is further controlled by the limit switches so that the upper slide has a compound movement controlled by two separate patterns of the pattern assembly to complete two cycles of operation.

Other objects and a fuller understanding of the invention may be had by referring to the following description and claims, taken in conjunction with the accompanying drawings, in which:

Figure 2 is an elevational view partially in section of the pattern support table which preferably is carried by the bed of the lathe;

Figure 3 is an enlarged sectional view taken on the line 3—3 of Figure 2 showing the details of the actuating mechanism for the pattern support table;

Figure 4 is a plan view of the air cylinder and taken along the line 4—4 of Figure 3;

Figure 5 is an elevational view of the air cylinder and taken along the line 5—5 of Figure 2;

Figure 1:
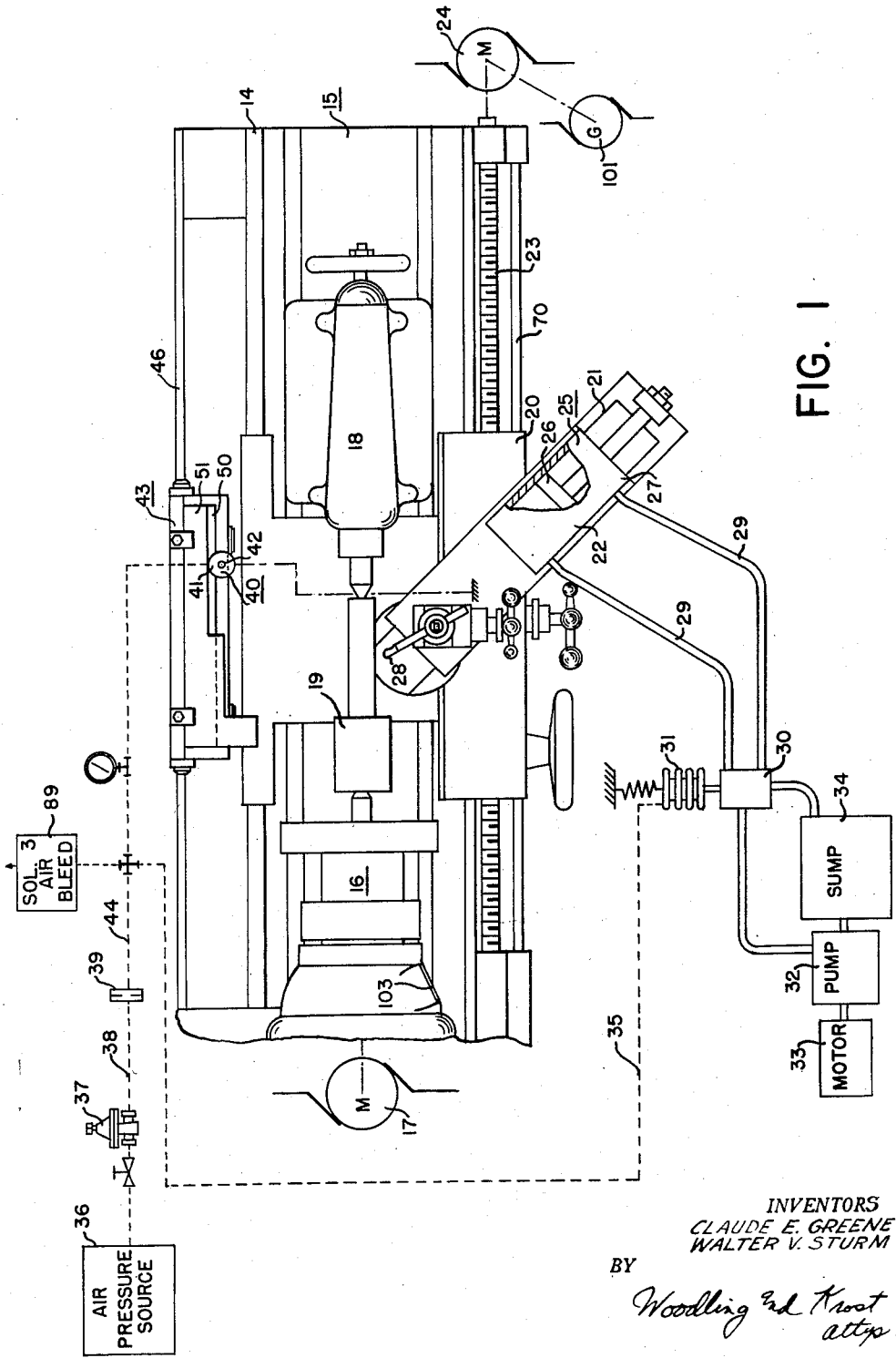
Figure 1 is a plan view of a lathe embodying the features of the invention.

The automatic cycling mechanism shown in this preferred embodiment is illustrated in connection with a lathe; however, it will be apparent that this invention may be applied to any other form of machine tool. The Figure 1 shows a plan view of a lathe 15 embodying the invention, which lathe has a headstock 16 driven from a spindle motor 17 and wherein a tailstock 18 cooperates with the headstock 16 to support a representative workpiece 19. A carriage 20 is slidable on ways 14 of the bed of the lathe 15 and supports cross slide ways 21 on which reciprocate a cross slide 22. In this preferred embodiment the cross slide is designed to reciprocate along a path at an acute angle to the path of reciprocation of the carriage 20 in order to achieve one of the novel effects of the invention, to be later described. A lead screw 23 is provided driven by a carriage motor 24 to reciprocate the carriage 20. Preferably this carriage motor 24 is a variable speed reversible electric motor.

The cross slide 22 is powered by a hydraulic servomotor 25 which has a piston 26 fixedly fastened relative to the carriage 20 which has a cylinder 27 fixedly fastened to the cross slide 22 so that the entire cylinder 27 moves to move a tool 28 for operating upon the workpiece 19. Flexible conduits 29 lead from opposite ends of the cylinder 27 to a selector valve 30 which in turn is controlled by a compressed air bellows 31. The selector valve 30 controls the flow of hydraulic fluid from a pump 32 driven by a motor 33 and obtaining hydraulic fluid from a sump 34 which also receives hydraulic fluid on the return from the selector valve 30. The bellows 31 is controlled in its elongation by air pressure received through a conduit 35 which has been shown diagrammatically, and this conduit 35 is supplied with air under pressure from an air pressure source 36. A pressure regulator 37 controls pressure in a subsequent conduit 38 and an orifice 39 presents a fixed impedance to the flow of air therethrough. A tracer device 40 has a body 41 and a movable tracer finger 42 which is movable in a direction which is parallel to the movement of the cross slide 22. This tractor device 40 is mechanically tied to the cross slide 22 and is adapted to cooperate with a pattern assembly 43 in order to have relative movement between this pattern assembly 43 and tracer 40 which corresponds to the movement of the tool 28 relative to the workpiece 19.

The tracer device 40 is designed to bleed air to atmosphere at a variable rate in accordance with the configuration of the particular pattern cooperting therewith and thus this variable air bleed will cause a variation in pressure in a conduit 44 which is subsequent to the orifice 39. This variable air pressure in the conduit 44 will likewise produce a variation in the air pressure in the conduit 35 to thus actuate the selector valve 30 through the agency of the bellows 31.

The Figures 2 and 3 show in more detail the construction of a pattern assembly 43. This assembly includes generally a pattern support bed 45 which is adapted to be fixedly clamped to a back rail 46 of the bed of the lathe 15. A pattern support table 47 is hingedly carried on the pattern support bed 45 by the bearings 48. The support table 47 has a finished upper surface 49 for carrying a plurality of flat plate edge-guide templates of which two are shown, namely, a roughing cut template 50 and a finishing cut template 51. The support table 47 further has a rear guide surface 52 against which the templates may abut and a plurality of clamps 53 are held on by the cap screws 54.

The support table is adapted to be pivoted relative to the support bed 45 by suitable actuation means shown in this embodiment as an air cylinder 55 which has reciprocable therein a piston 56. The lower end of the cylinder 55 is pivotally connected to the support bed 45 by the pivot 57, and the shank of the piston 56 is pivotally connected to the support table 47 by the pivot 58.

In the Figure 3 the piston 56 is shown in the downmost position wherein the support table 47 abuts a stop 59 on the support bed 45. The air cylinder 55 is supplied with air through fittings 60. As better shown in the Figures 7 and 8, a four-way valve 61 controls flow of air to either the top or the bottom of the cylinder 55 to thus actuate the pattern support table 47 either upwardly or downwardly and to hold it in such position. The support bed 45 is adapted to be fastened to the back rail 46 by the hand wheels 62.

Figure 9:
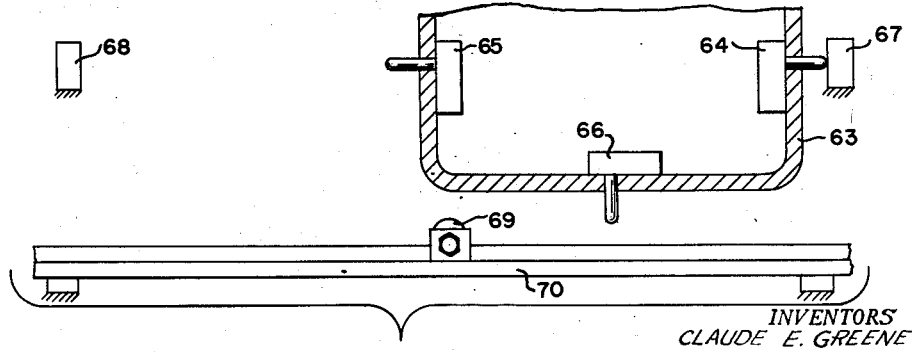
Figure 9 is a partial elevational view of the apron of the lathe containing the limit switches for controlling the operation of the automatic cycling mechanism; and, Figures 10 and 11 together form the complete electrical control system and electrical energization system for the automatic cycling mechanism.

The Figure 9 shows the apron 63 of the carriage 20 wherein this apron carries a right limit switch 64, a left limit switch 65, and an intermediate switch 66. The right limit switch 64 is adapted to abut a stop 67, and the left limit switch is adapted to abut a stop 68. The intermediate switch 66 is adapted to be actuated by a dog 69 movable on a front rail 70 of the lathe 15. The stops 67 and 68 are shown as fixed relative to the bed; however, it will be understood that they preferably are movable relative to the bed, such as being mounted upon the front rail 70 in order to adjust the position of the right and left limits.

Figure 7:
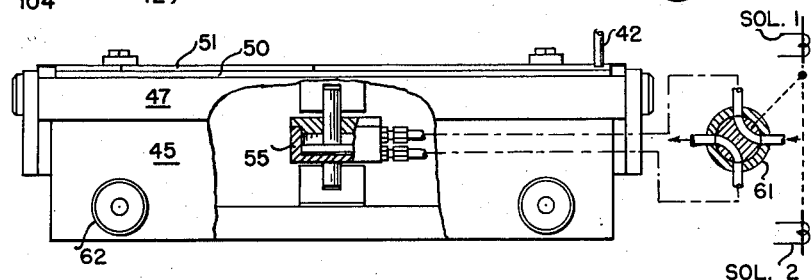
Figure 7 and Figure 8 are elevational views of the pattern support table which include the diagrammatic showings of the selector valve and with these figures showing the tracer in cooperation with the finishing and roughing cut templates, respectively.
Figure 8:
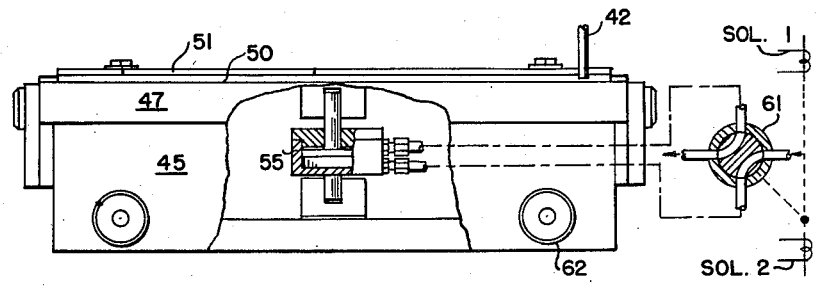
Figure 10:
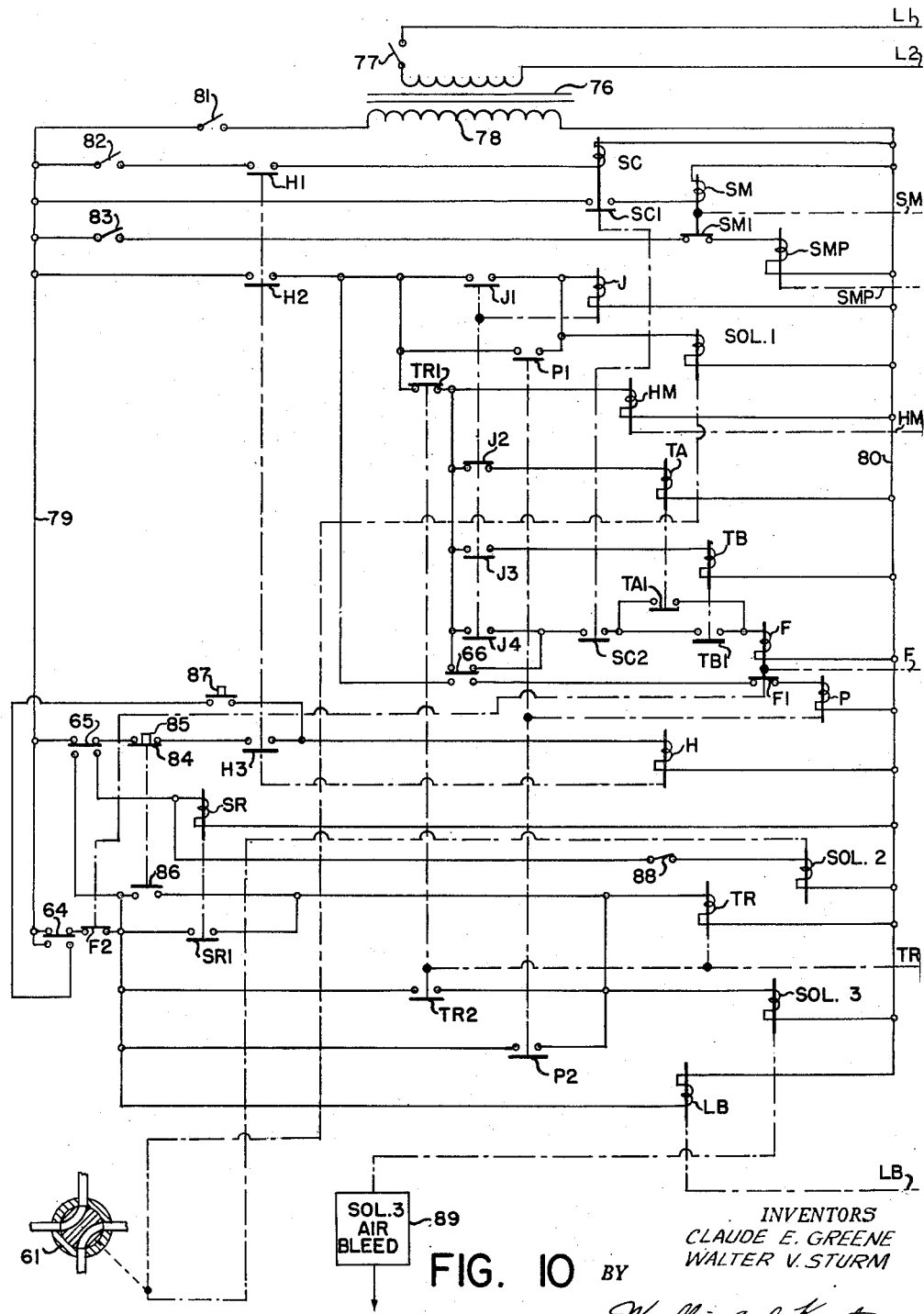
Figure 11:
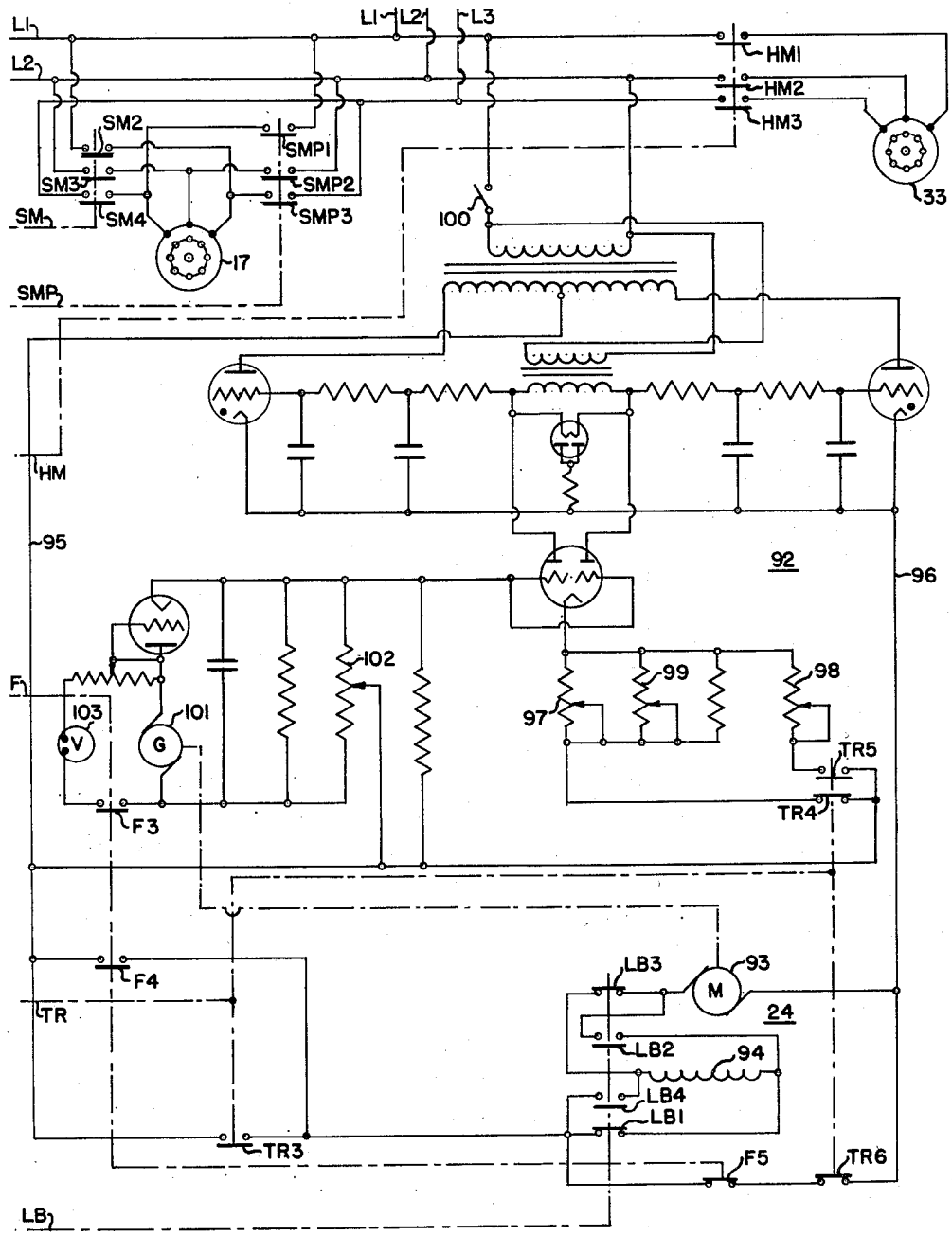

The Figures 10 and 11 show the electrical circuit and the energization system for the control of the movements of the entire lathe which is preferably energized directly from a three-phase alternating current source represented by the three lines L1, L2 and L3. Lines L1 and L2 energize a control transformer 76 through a switch 77. The control transformer 76 has a secondary 78 for energizing control lines 79 and 80. A control switch 81 controls energization to these control lines 79 and 80. A stop cycle relay SC is connected across the lines 79 and 80 through a stop cycle off-on switch 82 and normally open contacts H1. A spindle motor relay SM is connected across the lines 79 and 80 through the normally open contacts SC1. A spindle motor plugging relay SMP is connected across the control lines 79 and 80 through a plugging switch 83 and the normally closed contacts SM1. A jumper relay J is connected across the lines 79 and 80 through the normally open contacts H2 and the normally open contacts J1. A first solenoid SOL1 is paralleled across the jumper relay J. Second normally open contacts P1 are paralleled across the contacts J1. A hydraulic motor relay HM is connected across the control lines 79 and 80 through the aforementioned contacts H2 and normally closed contacts TR1. Paralleled across the hydraulic motor relay HM is the series combination of a first timer relay TA and the normally closed contacts J2. Also paralleled across this hydraulic motor relay HM is the series combination of a second timer TB and the normally open contacts J3. Further paralleled across this hydraulic motor relay HM is the series combination of relays and switches which includes a feed relay F, two paralleled normally open contacts TA1 and TB1, normally open contacts SC2 and normally open contacts J4. The upper contacts of the intermediate switch 66 are paralleled across the contacts J4. These upper contacts are the ones which are normally closed by the bias of the self-contained spring. A pickup relay P is connected across the lines 79 and 80 through the aforementioned contacts H2, the normally open lower contacts of the intermediate switch 66 and the normally closed contacts F1. A hold in relay H is connected across the lines 79 and 80 through the normally closed upper contacts of the left limit switch 65, the normally closed contacts 84 of the push-button reversing switch 85 and the normally open contacts H3. A solenoid relay SR is connected across the lines 79 and 80 through the lower normally open contacts of the left limit switch 65, the normally closed contacts F2 and the normally closed upper contacts of the right limit switch 64. The hold in relay H is further connected across the lines 79 and 80 through the lower normally open contacts of the right limit switch 64 and a start cycle push-button switch 87. A second solenoid SOL2 in series with a template cut-out switch 88 is paralleled across the solenoid relay SR. A traverse relay TR is connected across the lines 79 and 80 through normally open contacts TR2 and the aforementioned contacts F2 and switch 64. Paralleled across the contacts TR2 are the normally open contacts 86 of the reversing switch 85, further paralleled thereacross are the normally open contacts SR1 and still further paralleled thereacross are the normally open contacts P2. A third solenoid SOL3 is paralleled across the traverse relay TR. A longitudinal brake relay LB is connected across the lines 79 and 80 through the aforementioned contacts F2 and the switch 64. The third solenoid SOL3 actuates a solenoid air bleed 89 shown as a labeled rectangle which will be explained more fully in conjunction with the complete system shown in Figure 1. The first and second solenoids SOL1 and SOL2 actuate the four-way air valve 61 as shown in Figures 7 and 8 to thus direct air to either the upper or lower portion of the air cylinder 55 to thus actuate the pattern support table 47 downwardly or upwardly.

Figure 11 shows generally a rectifier system 92 which is capable of delivering variable amounts of power to the carriage motor 24. This carriage motor 24 is shown with an armature 93 and a field 94. The rectifier 92 is generally similar to that described in the copending application Serial No. 737,931, filed March 28, 1947, and the details of electronic control of this rectifier form no part of the instant invention. The rectifier 92 supplies varying amounts of energy across the supply lines 95 and 96 in accordance with the setting of one of a plurality of biasing potentiometers. A feed potentiometer 97 and a traverse potentiometer 98 are provided in this rectifier system 92 with the feed potentiometer 97 being connected in series with normally closed contacts TR4 and the traverse potentiometer 98 being connected in series with normally open contacts TR5. A maximum feed rate potentiometer 99 is also provided to limit the maximum feed rate of the carriage 20. The rectifier system 92 has been shown as being supplied with alternating current power from the lines L1 and L2 through the switch 100. The rectifier system is further provided with a compensating arrangement wherein a tachometer generator 101 is driven by the carriage motor 24 and is controlled in the amount of compensation by a compensating potentiometer 102. A feed meter 103 is also provided in circuit with the tachometer generator 101 to indicate the rate of feed of the carriage 20. Normally open feed relay contacts F3 are provided in series with the feed meter 103.

The carriage motor 24 is energized from the supply lines 95 and 96 and may be driven in either a forward or reverse direction and at variable speeds. This carriage motor 24 may be connected across the lines 95 and 96 for forward rotational direction, which would be fed left of the carriage 20, through the normally closed contacts LB3 and LB1 as well as one of the paralleled normally open contacts F4 or TR3. Such connection connects in series the armature 93 and the field 94. The additional contacts LB2 and LB4 provide for reversed connection of the field 94 relative to the armature 93 to thus reverse the rotational direction of the carriage motor 24. A dynamic braking circuit for the carriage motor 24 is provided by the normally closed contacts F5 and TR6 which short circuit the armature 93 upon the field 94.

The upper portion of the Figure 11 shows the hydraulic motor 33 illustrated as a three-phase induction motor adapted to be connected across the lines L1, L2 and L3 by the normally open contacts HM1, HM2 and HM3. Also, at the top of this figure is shown the three-phase spindle motor 17 which is adapted to be connected across the lines L1, L2 and L3 by the normally open contacts SM2, SM3 and SM4. This motor 17 may also be connected across the lines L1, L2 and L3 for reverse rotation by the normally open contacts SMP1, SMP2 and SMP3.

The Figure 1 shows that the tracer device 40 by variably bleeding air to atmosphere varies the air pressure in the conduit 44. Further connected to this conduit 44 is the solenoid air bleed 89 which when actuated by the third solenoid SOL3 discharges the compressed air in the conduit 44 at least to the point where the selector valve 30 is placed in the neutral position or is positioned even further to one end which establishes that the tool 28 will feed out away from the workpiece 19.

Operation

The automatic cycling mechanism provided by the instant invention is particularly useful wherein a roughing cut template 50 and a finishing cut template 51 are used to control movements of the tool 28 through the agency of the tracer device 40 through first and second cycles of operation in order to rapidly and accurately produce a completed workpiece. As best shown in the Figure 3 the roughing cut template 50 is first placed upon the upper surface 49 of the pattern support table 47 and then the finishing cut template 51 is placed upon this roughing cut template 50. The finishing cut template 51 is contoured to produce an accurately dimensioned workpiece 19 and the roughing cut template 50 is primarily used to remove a heavy cut of metal so that on the second cycle, which is the finishing cut, the tool 28 need take only a light cut which may be accurately controlled. Both templates 50 and 51 preferably abut the rear guide surface 52 for accurate location of these templates and the clamps 53 hold the templates fixedly to the pattern support table 47. The air cylinder 55 will swivel this pattern support table 47 up and down and the solid lines of Figure 3 show this table in the downmost position. Dotted lines in this Figure 3 show the position of the templates 50 and 51 when the support table is swiveled upwardly and the tracer finger 42 has also been shown in dotted lines for its cooperation with the roughing cut template 50 when such table is in its upmost position. The finishing cut template preferably will have a tracer relief portion 104 to cause the tracer 40, and hence the tool 28, to feed out away from the workpiece 19.

Figure 6:
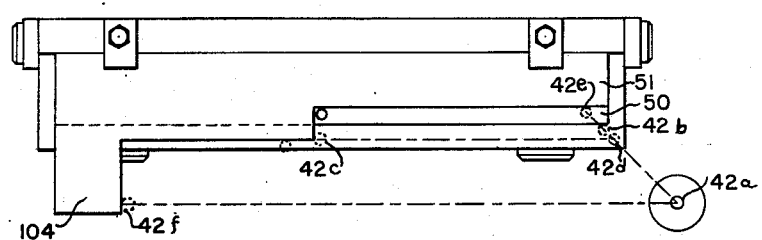
Figure 6 is a plan view of the pattern support table enlarged over that shown in the Figure 1 and showing the two cycles of movement of the tracer relative to the patterns.

The Figure 6 shows in dot-dash lines the two cycles of operation wherein the tracer finger starts at the position 42a. The second solenoid SOL2 would have been last to have been energized during the previous cycling and hence the four-way valve 61 will be in the position shown in Figure 8 which means that the pattern support table 47 will be swiveled upwardly so that the tracer finger 42 may cooperate with the roughing cut template 50. To start the cycle of operation, closing the switch 100 will energize the rectifier system 92 to produce a voltage across the supply lines 95 and 96. Closing the switch 77 will energize the control transformer 76, and further closing of the control switch 81 and the stop cycle off-on switch 82 places the control system of Figure 10 in condition to commence operation of the lathe 15. The right limit switch 64 will be actuated to the down position to close the lower contacts thereof when the tracer is in the position 42a shown in Figure 6. This is because the carriage 20 is at its rightmost limit. By depressing the start cycle button 87 the hold in relay H is energized. This closes contacts H3 as an electrical hold in for this relay. Contacts H1 close energizing the stop cycle relay SC, and contacts SC1 close energizing the spindle motor relay SM which in turn closes the contacts SM2, SM3 and SM4 to start the spindle motor 17. Contacts H2 close to energize the hydraulic motor relay HM and the first timer TA. Contacts HM1, HM2 and HM3 close, Figure 11, to start the motor 33 which causes the cross slide 22 to move in. The cross slide 22 moves in because the air controlled tracer system is set so that with high pressure in the conduit 44 and 35 the selector valve 30 is so positioned to permit flow of hydraulic fluid to the front of the hydraulic cylinder 27, thus moving the tool 28 inwardly. When the tracer finger 42 bleeds sufficient air from the conduit 44 to drop the pressure therein, the selector valve 30 is positioned in the opposite direction to cause flow of hydraulic fluid to the rear of the cylinder 27, and thus retract the tool 28 from the workpiece 19. This is a safety feature so that upon loss of air pressure for any reason the tool 28 will retract rather than advance into the workpiece 19. For this reason it will be seen that upon the actuation of the solenoid air bleed 89, which causes reduction of air pressure within the conduit 44, the tool 28 will attempt to retract.

After the tool 28 has moved in to the workpiece 19, it will be stopped at the work position by the tracer finger 42 being positioned relative to the tracer body 41 to bleed just sufficient air from the conduit 44 to establish the selector valve 30 in a neutral position. The first timer TA is set so that, as it times out, the slide 22 will have moved into the roughing cut template 50. The tracer finger 42 will then be at the position 42b, as shown in Figure 6.

This roughing cut template 50 has been swiveled up into a position for cooperation with the tracer finger 42 from the previous cycle by the second solenoid SOL2, as shown in Figure 8. The first timer TA, upon timing out, energizes the feed relay F through the contacts TA1, and contacts F4 close to start the carriage motor 24. Contacts F3 close completing the circuit to the feed meter 103, contacts F5 open to open the dynamic braking circuit, contacts F2 open to de-energize the longitudinal braking relay LB so that the circuit for the carriage motor 24 is established through the contacts LB1 and LB3 to effect rotation of the carriage motor 24 in the proper direction to feed the carriage 20 leftwardly. The tool 28, and hence the tracer 40 now moves leftwardly until the intermediate switch 66 is actuated by the dog 69, shown in Figure 9. The tracer finger will then be at the position 42c, as shown in Figure 6.

The intermediate switch 66, upon actuation, de-energizes the feed relay F and energizes the pickup relay P. Contacts P1 energize jumper relay J and the first solenoid SOL1. The first solenoid SOL1 causes the pattern support table 47 to pivot downwardly to the position shown in Figure 7. Contacts J1 are electrical hold in contacts for the jumper relay J, contacts J2 take the first timer TA out of the circuit and contacts J3 place the second timer TB in its place. Contacts J4 close so that on the second cycle the intermediate switch 66 causes no change in the control circuit upon actuation of this intermediate switch 66. Contacts P2 energize the traverse right relay TR and the third solenoid SOL3. Contacts TR2 are electrical hold in contacts for this relay and solenoid. The actuation of the third solenoid SOL3 actuates the solenoid air bleed 89 to reduce the air pressure in the conduit 35 at least to the point where the tool 28 no longer attempts to feed inwardly. The contacts TR1 open so that the motor 33 stops, and thus the tool 28 is locked in position. Although the contacts J3 are closed the contacts TR1 are open, so therefore the second timer TB will not commence to time out until after the traverse right portion of the cycle has been completed. Contacts TR3 energize the carriage motor 24, contacts TR6 open the dynamic braking circuit, and contacts TR4 and TR5 operate to take out the feed potentiometer 97 and place in the traverse potentiometer 98. Since the feed relay F is de-energized the contacts F2 will be closed to energize the longitudinal brake relay LB, and hence the carriage motor 24 will be connected across the supply lines 95 and 96 through the contacts LB2 and LB4. This reverses the carriage motor 24 to traverse the lathe carriage 20 to the right.

Upon reaching the right stop 67 the right limit switch 64 is actuated and the tracer finger 42 will be in the position 42d, as shown in Figure 6. Actuation of the switch 64 places all controls in the positions they had taken after the start cycle button 87 had been depressed, with the exception of the jumper relay J. This relay has substituted the second timer TB for the first timer TA, has bridged the intermediate switch 66 with the contacts J4 and has energized the first solenoid SOL1 to pivot the pattern support table 47 downwardly. The tracer 40 now moves into the finishing cut template 51, as shown in the Figure 7. The tracer finger 42 will now be in the position 42e, as shown in the Figure 6. The finishing cut template 51 is now traced under control of the tracer 40 with the carriage 20 moving to the left. Actuation of the intermediate switch 66 during this tracing of the finishing cut template 51 has no effect upon the control system since the contacts J4 which are now closed bridge this intermediate switch 66 to thus keep the feed relay F energized and hence preventing energization of the pickup relay P. Upon the carriage 20 reaching the left limit, the stop 68 will actuate the left limit switch 65, the solenoid relay SR and the second solenoid SOL2 are energized and the hold in relay H is de-energized. Deenergization of the hold in relay H de-energizes the stop cycle relay SC and spindle motor relay SM to thus close the contacts SM1. If the plugging switch 83 has been closed, the spindle motor plugging relay SMP will be energized to plug the spindle motor 17. Provision may be made to prevent reversal of the spindle motor during plugging of this motor with the plugging switch 83 closed so that the plugging may be used merely for rapid braking of this motor. Upon reaching this left limit, the tracer finger will be in the position 42f, shown in Figure 6. The left limit 68 will actuate the left limit switch 65 to thus energize the solenoid relay SR and the second solenoid SOL2. Upon energization of the second solenoid SOL2, the pattern support table 47 will be swiveled upwardly in a position to start the next feed of two complete cycles. The hold in relay H will be deenergized and the contacts SR1 now being closed energize the traverse right relay TR. The machine now goes into the rapid traverse right cycle previously explained with the exception that the hold in relay H is now de-energized. Upon reaching the right stop 67 the right limit switch 64 is actuated, de-energizing the traverse right relay TR and stopping the cycle at this point. The controls are now in their original positions ready to have another set of two cycles to be performed upon the closing of the start cycle button 87. This control circuit, shown in the Figure 10, is novel inasmuch as the limit and intermediate switches 64, 65 and 66 do not always set up the same conditions.

The plugging switch 83, if opened, prevents the spindle motor plugging relay SMP from becoming actuated and hence there will be no plugging of this spindle motor. The reversing switch 85 is used to disconnect the circuit to the hold in relay, thereby de-energizing all relays which are above this relay in the Figure 10. Also, this reversing switch 85 will energize the traverse right relay TR to bring about the traverse right portion of the cycle. The template cut-out switch 88 may be opened, which thus prevents energization of the second solenoid SOL2 which means that the pattern support table 47 is never swiveled upwardly, and thus a single template may be used with this automatic cycling mechanism. When this switch 88 is opened the trip dog 69 should be omitted from the front rail 70 so that the intermediate switch 66 will not be actuated. There will thus be only the final cycle of operation as controlled by the left limit switch 65 and the right limit switch 64.

Opening of the stop cycle switch 82 during feed left for either of the two cycles will stop the cycle at that point for the stop cycle relay SC will be de-energized to stop the spindle motor to de-energize the feed relay, thus stopping the feed left of the carriage 20 and also energizing the longitudinal brake LB.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A control system for a machine tool having first and second movable parts with said second part having a servomotor powered movement controlled by a single tracer device cooperating with a pattern assembly, said tracer device having a body and a finger movable relative thereto along a first path with said relative movement controlling said servomotor, said control system including a first and a second pattern, said first and second patterns being of different shapes, first means including said first pattern and said tracer for providing to said parts a given closed cycle of operation having an operational and a return stroke, second means having a first condition and a second condition and in said first condition being responsive to at least a part of said return stroke to shift both the first and second patterns in a first direction substantially perpendicular to said first path to establish the second pattern in a position for cooperation with said tracer and third means including said second pattern and said tracer for providing to said parts a closed cycle of operation similar to said given cycle and having a second operational stroke and a return stroke, said second means in said second condition being responsive to at least a part of said last-named return stroke to shift both the first and second patterns in a direction opposite to said first direction to establish the first pattern in a position for cooperation with said tracer.

2. A control system for a machine tool, said machine tool including a bed, a first slide driven by power along said bed, a second slide superposed on said first slide, and power means for driving said second slide; a tracer operatively connected to said second slide and controlling said power means, a pattern table carrying first and second templates, said pattern table being mounted on hinges so that it has a first position wherein said first template co-operates with said tracer and a second position wherein said second template co-operates with said tracer, a switch actuatable by said first slide as it moves along said bed, and a motor operatively connected to said switch and said pattern table to move said table from said first position to said second position upon actuation of said switch.

3. In a machine tool having a first part translatable on ways of the bed of the machine tool and a second part translatable on the first part, with power means for providing powered movement of said first part and a servomotor providing controllable powered movement of said second part under control of a tracer and pattern mechanism, a pattern assembly including a pattern support bed fixedly carried by said machine tool bed, a pattern support table hingedly carried by said support bed with the axis of the hinge parallel to the direction of translation of said first part, clamp means on said support table adapted to clamp to said table a plurality of flat plate edge-guide templates in overlapping and staggered relationship, actuating means to move said support table relative to said bed substantially perpendicular to the translational direction of said second part, control means operatively connected to said actuating means for actuation thereof during at least part of the translation of said first part to change the cooperation of said tracer with one of said plurality of templates to another of said templates.

4. In a machine tool having a bed, a first slide movable along said bed, a first power means to move said first slide, a second slide slidable along said first slide, servomotor power means to move said second slide, said first and second power means cooperating to move said second slide along various paths, a tracer operatively connected to and controlling forward and rearward movements of said servomotor power means; a pattern table adapted to carry a roughing and a finishing template, said finishing template being arranged to impart a different shaped path than said roughing template to said second slide, a movable support means for said pattern table to allow said pattern table to assume a first position where the roughing template is engageable by said tracer and a second position where said finishing template is engageable by said tracer, a motor operatively connected to said pattern table to move said table from said first position to said second position, and a switch connected to control energization to said motor and actuated by said first slide.

References Cited in the file of this patent

UNITED STATES PATENTS

| | | |
|---|---|---|
| 1,946,839 | Coe | Feb. 13, 1934 |
| 1,952,231 | Anderson | Mar. 27, 1934 |
| 2,037,635 | Knowles | Apr. 14, 1936 |
| 2,335,625 | Wilson | Nov. 30, 1943 |
| 2,402,450 | Salisbury | June 18, 1946 |
| 2,433,048 | Himoff | Dec. 23, 1947 |
| 2,468,307 | Overholt | Apr. 26, 1949 |
| 2,475,326 | Johnson | July 5, 1949 |
| 2,540,323 | Cross | Feb. 6, 1951 |
| 2,634,644 | Johnson | Apr. 14, 1953 |

FOREIGN PATENTS

| | | |
|---|---|---|
| 623,357 | Germany | Dec. 5, 1935 |